(12) United States Patent
Murota et al.

(10) Patent No.: US 9,362,591 B2
(45) Date of Patent: Jun. 7, 2016

(54) ALL-SOLID-STATE LITHIUM ION BATTERY AND POSITIVE ELECTRODE MIXTURE (71) Applicant: SANTOKU CORPORATION, Kobe-shi, Hyogo (JP)

(72) Inventors: Tadatoshi Murota, Kobe (JP); Masatoshi Kusatsu, Kobe (JP); Yoshikatsu Seino, Sodegaura (JP); Masakatsu Kimura, Sodegaura (JP); Tsuyoshi Ota, Sodegaura (JP)

(73) Assignee: SANTOKU CORPORATION, Hyogo (JP)

( * ) Notice: Subject to any disclaimer, the term of this patent is extended or adjusted under 35 U.S.C. 154(b) by 0 days.

(21) Appl. No.: 14/422,952

(22) PCT Filed: Jul. 25, 2013

(86) PCT No.: PCT/JP2013/004537
§ 371 (c)(1),
(2) Date: Feb. 20, 2015

(87) PCT Pub. No.: WO2014/030298
PCT Pub. Date: Feb. 27, 2014

(65) Prior Publication Data
US 2015/0221978 A1 Aug. 6, 2015

(30) Foreign Application Priority Data
Aug. 21, 2012 (JP) ................... 2012-182402

(51) Int. Cl.
*H01M 10/0562* (2010.01)
*H01M 4/505* (2010.01)
(Continued)

(52) U.S. Cl.
CPC .......... *H01M 10/0562* (2013.01); *H01M 4/366* (2013.01); *H01M 4/505* (2013.01);
(Continued)

(58) Field of Classification Search
CPC ............................. H01M 4/405; H01M 4/525
See application file for complete search history.

(56) References Cited

U.S. PATENT DOCUMENTS

| 2011/0229757 | A1  | 9/2011  | Kawakami et al. |
| 2012/0264016 | A1* | 10/2012 | Sueki ............ H01M 4/136 429/213 |
| 2012/0321955 | A1  | 12/2012 | Yasuda et al. |

FOREIGN PATENT DOCUMENTS

| JP | H09-55211 A | 2/1997 |
| JP | 2008-103280 A | 5/2008 |

(Continued)

OTHER PUBLICATIONS

English translation of the International Preliminary Report on Patentability for PCT/JP2013/004537 mailed on Mar. 5, 2015.
English translation of the International Search Report for PCT/JP2013/004537 mailed on Oct. 15, 2013.

*Primary Examiner* — Jane Rhee
(74) *Attorney, Agent, or Firm* — Novick, Kim & Lee, PLLC; Jae Youn Kim

(57) ABSTRACT

A positive electrode mixture including
a positive electrode active material represented by the following formula (1); and a solid electrolyte that comprises Li and S:

$$a\mathrm{Li}_2\mathrm{MnO}_3 \cdot b\mathrm{LiNi}_{1-y}\mathrm{M}^1_y\mathrm{O}_2 \cdot c\mathrm{LiM}^2_v\mathrm{M}^3_w\mathrm{M}^4_x\mathrm{O}_2 \quad (1)$$

wherein $M^1$ is one or more elements selected from Co, Mn, Al, Fe, Cu, V, Zn and Cr; $M^2$, $M^3$ and $M^4$ are independently one or more elements selected from Ni, Co, Mn, Al, Fe, Cu, V, Zn and Cr; $M^2$, $M^3$ and $M^4$ are elements different from each other; a, b and c satisfy $a+b+c=1$, $0<a<1$, $0<b<1$ and $0<c<1$; y satisfies $0 \le y \le 1$; and v, w and x satisfy $v+w+x=1$, and satisfy $0 \le v \le 1$, $0 \le w \le 1$ and $0 \le x \le 1$.

5 Claims, 4 Drawing Sheets (51) Int. Cl.
*H01M 4/525* (2010.01)
*H01M 4/36* (2006.01)
*H01M 10/0525* (2010.01)
*H01M 4/02* (2006.01)

(52) U.S. Cl.
CPC ......... *H01M 4/525* (2013.01); *H01M 10/0525* (2013.01); *H01M 2004/021* (2013.01); *H01M 2300/0071* (2013.01); *Y02E 60/122* (2013.01); *Y02T 10/7011* (2013.01)

(56) References Cited

FOREIGN PATENT DOCUMENTS

| | | |
|---|---|---|
| JP | 2009-176541 A | 8/2009 |
| JP | 2011-071083 A | 4/2011 |
| JP | 2011-216476 A | 10/2011 |
| JP | 2011-228052 A | 11/2011 |
| JP | 2012-190772 A | 10/2012 |

* cited by examiner

ALL-SOLID-STATE LITHIUM ION BATTERY AND POSITIVE ELECTRODE MIXTURE

TECHNICAL FIELD

The invention relates to an all-solid lithium ion battery and a positive electrode mixture.

BACKGROUND ART

In recent years, in order to solve environmental and energy problems, various electric cars have been expected to be widespread. As the on-vehicle power source such as a motor drive power source that is crucial for practical application of these electric cars, development of secondary batteries has been actively conducted. However, in order to attain widespread use, it is required to allow batteries to have high performance and to be more inexpensive. Further, as for electric cars, they are required to have a mileage per charge that is closer to gasoline engine powered cars. Under such circumstances, a battery having higher energy has been awaited.

In order to allow a battery to have a high energy density, an amount of electricity stored per unit mass of each of a positive electrode and a negative electrode is required to be large. As the positive electrode material that may be able to meet such a request, a so-called solid-solution positive electrode has been studied (for example, Patent Document 1).

RELATED ART DOCUMENTS

Patent Document

Patent Document 1: JP-A-H09-55211

SUMMARY OF THE INVENTION

However, the lithium ion battery disclosed in Patent Document 1 has a capacity of 560 mA at about 1 C. That is, at present, a high-capacity battery has not been realized yet.

An object of the invention is to provide a high-capacity lithium ion battery and a positive electrode mixture used in the battery.

According to the invention, the following positive electrode mixture and the following all-solid lithium ion battery are provided.

1. A positive electrode mixture comprising:
   a solid-solution positive electrode active material represented by the following formula (1); and
   a solid electrolyte that comprises Li and S:

$$a\text{Li}_2\text{MnO}_3 \cdot b\text{LiNi}_{1-y}\text{M}^1_y\text{O}_2 \cdot c\text{LiM}^2_v\text{M}^3_w\text{M}^4_x\text{O}_2 \quad (1)$$

wherein $M^1$ is one or more elements selected from Co, Mn, Al, Fe, Cu, V, Zn and Cr; $M^2$, $M^3$ and $M^4$ are independently one or more elements selected from Ni, Co, Mn, Al, Fe, Cu, V, Zn and Cr; $M^2$, $M^3$ and $M^4$ are elements different from each other; a, b and c satisfy $a+b+c=1$, $0<a<1$, $0<b<1$ and $0<c<1$; y satisfies $0 \leq y \leq 1$; and v, w and x satisfy $v+w+x=1$, and satisfy $0 \leq v \leq 1$, $0 \leq w \leq 1$ and $0 \leq x \leq 1$.

2. The positive electrode mixture according to 1, wherein the positive electrode active material is represented by the following formula (2):

$$a\text{Li}_2\text{MnO}_3 \cdot b\text{LiNi}_{1/2}\text{Mn}_{1/2}\text{O}_2 \cdot c\text{LiNi}_{1/3}\text{Mn}_{1/3}\text{Co}_{1/3}\text{O}_2 \quad (2)$$

wherein a, b and c satisfy $a+b+c=1$, $0<a<1$, $0<b<1$ and $0<c<1$.

3. The positive electrode mixture according to 1 or 2, wherein the surface of the positive electrode active material is modified with an ionic conductive oxide-based solid electrolyte.

4. The positive electrode mixture according to any one of 1 to 3, wherein the particle size of the positive electrode active material is 20 μm or less.

5. An all-solid lithium ion battery comprising:
   a positive electrode that is produced by using the positive electrode mixture according to any one of 1 to 4; and
   an electrolyte layer comprising a solid electrolyte that comprises Li and S.

6. An all-solid lithium ion battery comprising:
   a positive electrode layer comprising a solid-solution positive electrode active material represented by the following formula (1) and a solid electrolyte that comprises Li and S; and
   an electrolyte layer comprising a solid electrolyte that comprises Li and S:

$$a\text{Li}_2\text{MnO}_3 \cdot b\text{LiNi}_{1-y}\text{M}^1_y\text{O}_2 \cdot c\text{LiM}^2_v\text{M}^3_w\text{M}^4_x\text{O}_2 \quad (1)$$

wherein $M^1$ is one or more elements selected from Co, Mn, Al, Fe, Cu, V, Zn and Cr; $M^2$, $M^3$ and $M^4$ are independently one or more elements selected from Ni, Co, Mn, Al, Fe, Cu, V, Zn and Cr; $M^2$, $M^3$ and $M^4$ are elements different from each other; a, b and c satisfy $a+b+c=1$, $0<a<1$, $0<b<1$ and $0<c<1$; y satisfies $0 \leq y \leq 1$; and v, w and x satisfy $v+w+x=1$, and satisfy $0 \leq v \leq 1$, $0 \leq w \leq 1$ and $0 \leq x \leq 1$.

According to the invention, it is possible to provide a positive electrode mixture that can realize a high-capacity lithium ion battery and a lithium ion battery using the same.

MODE FOR CARRYING OUT THE INVENTION

A. First Positive Electrode Mixture of the Invention

A first positive electrode mixture of the invention comprises a positive electrode active material represented by the following formula (1) and a solid electrolyte that comprises Li and S.

$$a\text{Li}_2\text{MnO}_3 \cdot b\text{LiNi}_{1-y}\text{M}^1_y\text{O}_2 \cdot c\text{LiM}^2_v\text{M}^3_w\text{M}^4_x\text{O}_2 \quad (1)$$

The formula (1) shows that the positive electrode active material used in the invention is a solid-solution positive electrode active material.

In the formula (1), $M^1$ is one or more metal elements selected Co, Mn, Al, Fe, Cu, V, Zn and Cr. It is preferred that $M^1$ be Co, Mn, Al, Fe or Cu.

$M^2$, $M^3$ and $M^4$ are independently one or more metal elements selected from Ni, Co, Mn, Al, Fe, Cu, V, Zn and Cr. They are elements different from each other. It is preferred that $M^2$, $M^3$ and $M^4$ be independently any of Ni, Co, Mn, Al, Fe, Cu, V, Zn or Cr.

y is 0 or more and 1 or less. Preferably, y is 0.5.

v, w and x are independently 0 or more and 1 or less and satisfy $v+w+x=1$.

Preferably, $v=1/3$, $w=1/3$ and $x=1/3$.

a is a composition ratio (molar ratio) of $Li_2MnO_3$ present in the positive electrode active material. Similarly, b is a composition ratio of $LiNi_{1-y}M^1_yO_2$, and c is a composition ratio of $LiM^2_vM^3_wM^4_xO_2$. a to c satisfy the relationships represented by the following formulas (1-1) to (1-4).

$$a+b+c=1 \quad (1\text{-}1)$$

$$0<a<1 \quad (1\text{-}2)$$

$$0<b<1 \quad (1\text{-}3)$$

$$0<c<1 \quad (1\text{-}4)$$

It is preferred that a be 0.9 or less, with $0.2 \leq a \leq 0.8$ being particularly preferable.

It is preferred that b be 0.9 or less, with $0.1 < b \leq 0.7$ being particularly preferable.

It is preferred that c be 0.9 or less, with $0.1 < c \leq 0.7$ being particularly preferable.

In the invention, it is preferred that the positive electrode active material be one represented by the formula (2).

$$aLi_2MnO_3\text{-}bLiNi_{1/2}Mn_{1/2}O_2\text{-}cLiNi_{1/3}Mn_{1/3}Co_{1/3}O_2 \quad (2)$$

In the formula (2), a to c are as defined in the formula (1).

Figure 1:
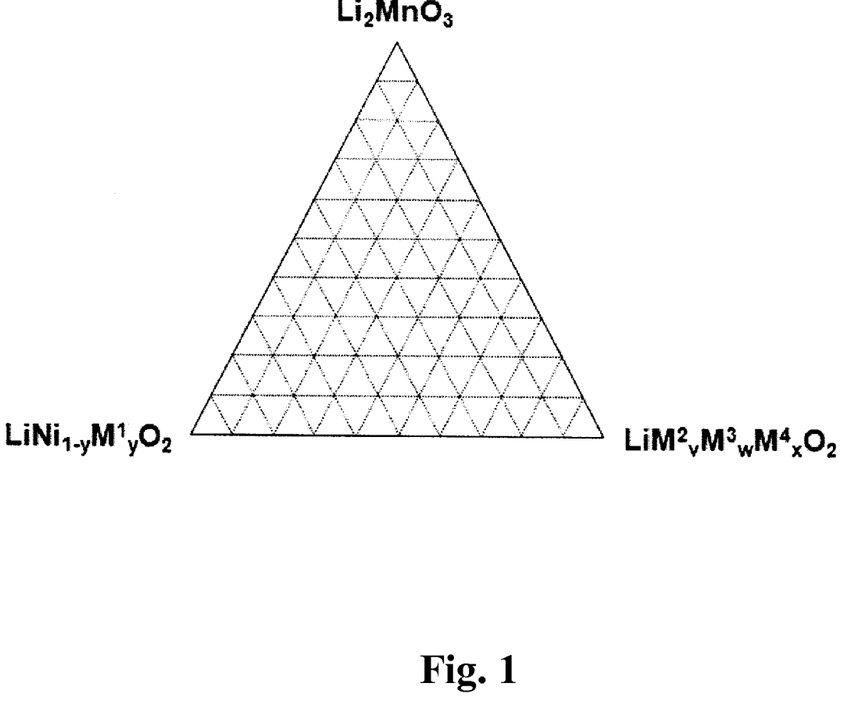
FIG. 1 is a triangular phase diagram of a solid-solution positive electrode active material ($\text{Li}_2\text{MnO}_3 \cdot b\text{LiNi}_{1-y}\text{M}^1_y\text{O}_2 \cdot c\text{LiM}^2_v\text{M}^3_w\text{M}^4_x\text{O}_2$)
Figure 2:
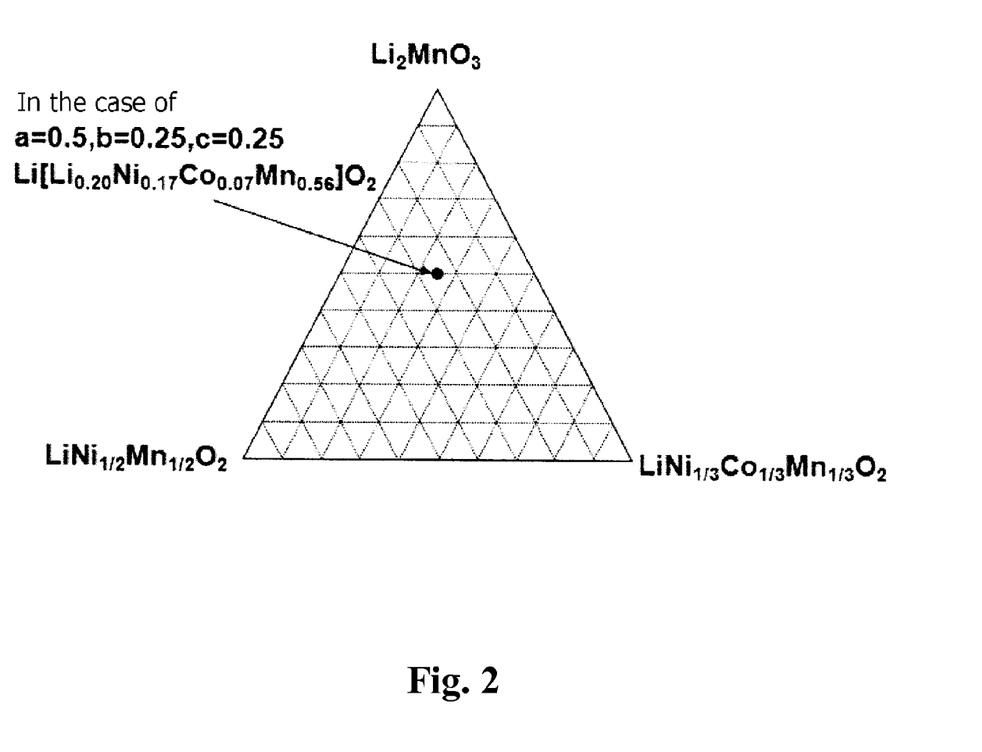
FIG. 2 is a triangular phase diagram showing the composition of the positive electrode active material prepared in Production Example 2.

In the invention, the solid-solution positive electrode active material be formed of a solid solution of a lithium transition metal composite oxide represented by $LiNi_{1-y}M^1_yO_2$ or $LiM^2_vM^3_wM^4_xO_2$ and a lithium manganese oxide represented by $Li_2MnO_3$ and can be represented by the above formula (1). The solid-solution positive electrode active material is included in a region of a triangle phase diagram shown in FIG. 1 with $Li_2MnO_3$ and $LiNi_{1-y}M^1_yO_2$ and $LiM^2_vM^3_wM^4_xO_2$ being apexes thereof, and can be indicated by dots plotted in this region. For example, in the formula (1), a solid-solution positive electrode active material in which a=0.5, b=0.25, c=0.25, y=1/2, v=1/3, w=1/3, x=1/3, $M^1$=Mn, $M^2$=Ni, $M^3$=Co and $M^4$=Mn (see Production Example 2) can be indicated by the dots shown in FIG. 2. When expressed by the formula (1), it is expressed by $0.5Li_2MnO_3\text{-}0.25LiNi_{1/2}Mn_{1/2}O_2\text{-}0.25LiNi_{1/3}Mn_{1/3}Co_{1/3}O_2$.

The formula (1) can be simply expressed collectively according to each element. For example, the above-mentioned example can be indicated as $Li[Li_{0.20}Ni_{0.17}Co_{0.07}Mn_{0.56}]O_2$.

One of the features of the solid-solution positive electrode active material of the invention is invention is that the content of Li is higher as compared with conventional positive electrode active materials.

The $Li_2MnO_3$ in the formula (1) can be rephrased to $Li[Li_{1/3}Mn_{2/3}]O_2$. As in the case of $LiNi_{1-y}M^1_yO_2$ and $LiM^2_vM^3_wM^4_xO_2$, it has a layered rock salt structure. $Li[Li_{1/3}Mn_{2/3}]O_2$ is a representative example of a rock salt structure containing $Li^+$ and $Mn^{4+}$. The theoretical capacity is high, i.e. 458.3 mAh/g. However, it is known that, since it is an electrically inactive material, almost no charging/discharging capacity can be obtained when used as a single substance. Therefore, $Li[Li_{1/3}Mn_{2/3}]O_2$ is brought into a solid-solution state with a lithium transition metal complex oxide represented by $LiNi_{1-y}M^1_yO_2$ or $LiM^2_vM^3_wM^4_xO_2$ such that the composition thereof becomes close to that of $Li_2MnO_3$. By utilizing electrically highly active properties of $LiNi_{1-y}M^1_yO_2$ or $LiM^2_vM^3_wM^4_xO_2$, a high-capacity material can be obtained.

The solid-solution positive electrode active material of the invention means a positive electrode active material in which $Li_2MnO_3$, $LiNi_{1-y}M^1_yO_2$ and $LiM^2_vM^3_wM^4_xO_2$ are homogeneously dissolved to form a solid-solution phase.

When an explanation is made taking the above-mentioned composition as an example, the solid-solution positive electrode active material of the invention is not a mixture obtained simply mixing $Li_2MnO_3$ powder, $Li[Ni_{1/2}Mn_{1/2}]O_2$ powder and $Li[Ni_{1/3}Co_{1/3}Mn_{1/3}]O_2$ powder. In the case of a material obtained by simply mixing the above-mentioned powders, effects of using the solid-solution positive electrode active material are not obtained, and as a result, a battery having a large discharge capacity cannot be realized.

The fact that the positive electrode active material has a composition represented by the formula (1) can be confirmed by a quantitative analysis by ICP (Inductively Coupled Plasma) emission spectrometry. At the time of identification, it is preferable to indicate by a simply expressed composition formula.

The positive electrode active material is not a mixture obtained by simply mixing each component mentioned above, but a solid-solution positive electrode active material. This fact can be confirmed by powder X-ray diffraction (XRD) by using $CuK\alpha$ a rays. In the solid-solution positive electrode active material, a peak is observed at around $2\theta=20$ to $25°$. This diffraction peak at around $2\theta=20$ to $25°$ is a diffraction peak observed in a $Li_2MnO_3(Li[Li_{1/3}Mn_{2/3}]O_2)$-type monoclinic crystal. Thus, the solid-solution positive electrode active material is characterized by having a diffraction peak derived from $Li_2MnO_3$ ($Li[Li_{1/3}Mn_{2/3}]O_2$) at around $2\theta=20$ to $25°$. This peak is a diffraction peak observed by regular arrangement of Li in the transition metal layer with a triple period, and the positive electrode active material is assumed to have a superlattice structure. If the content of $Li_2MnO_3(Li[Li_{1/3}Mn_{2/3}]O_2)$ is large, the diffraction peak intensity is increased. As mentioned above, a mixture obtained by simple mixing is not a solid-solution positive electrode active material, and a diffraction peak at around $2\theta=20$ to $25°$ that is observed in the solid-solution positive electrode active material is not observed. If powder X-ray diffraction is conducted for a mixture obtained by simply mixing powders, only a diffraction pattern corresponding to individual powder can be obtained. No diffraction peak that is observed in a $Li_2MnO_3(Li[Li_{1/3}Mn_{2/3}]O_2)$-type monoclinic crystal is observed.

An explanation will be made on the method for producing a solid-solution positive electrode active material of the invention.

As the method for forming an oxide having an intended composition, a "solid phase method" in which salts of each of Li, Mn, Ni or the like are mixed and fired, or a "co-precipitation method" in which a precursor in which Mn, Ni or the like are co-precipitated is prepared in advance, and the precursor is fired to obtain an oxide, followed by mixing a Li salt and firing.

Here, the method for producing a solid-solution positive electrode active material by the "co-precipitation method" will be explained taking $Li_2MnO_3$—$Li[Ni_{1/2}Mn_{1/2}]O_2$—$Li[Ni_{1/3}Co_{1/3}Mn_{1/3}]O_2$, that is a Li—Ni—Co—Mn-based solid-solution oxide, as an example, in which a carbonate is used as a precursor. The method is not limited thereto.

An aqueous solution of manganese/nickel/cobalt that is obtained by mixing an aqueous solution of a manganese compound such as an aqueous manganese sulfate solution and an aqueous manganese nitrate solution; an aqueous solution of a nickel compound such as an aqueous nickel sulfate solution and an aqueous nickel nitrate solution and an aqueous solution of a cobalt compound such as an aqueous solution of cobalt sulfate and an aqueous solution of cobalt nitrate, and an aqueous alkali solution such as an aqueous sodium carbonate solution, sodium hydroxide and an aqueous ammonia solution are respectively added to a reaction chamber with stirring while controlling temperature and pH, whereby an aqueous solution of manganese/nickel/cobalt carbonate is obtained.

In the reaction chamber, a complexing agent of an ammonium salt such as ammonium sulfate and ammonium nitrate may be appropriately added, for example.

By washing the aqueous solution of manganese/nickel/cobalt carbonate with pure water and filtered, followed by drying at 50 to 150° C. for 30 minutes to 30 hours to obtain a carbonate, and fired at 300 to 1000° C. for 30 minutes to 10 hours, whereby a manganese/nickel/cobalt oxide is obtained To the resulting oxide, a lithium salt such as lithium hydroxide hydrate is added and mixed, followed by firing at 500 to 1500° C. for 30 minutes to 24 hours, whereby a solid-solution positive electrode active material is obtained. As for firing, after pre-firing at a temperature that is lower than an intended firing temperature, the temperature may be elevated to the intended firing temperature.

To the particle size, the shape, the particle size distribution, the tap density or the like of the solid-solution positive electrode active material can be controlled by the concentration of a starting material (e.g. an aqueous solution for synthesizing a carbonate as a raw material), the concentration of an aqueous alkaline solution, the adding speed, pH, temperature, firing conditions of a carbonate, firing conditions for synthesizing a positive electrode active material using the resulting oxide, and the type of a lithium salt used. The ratio of each of the constitutional elements of the positive electrode active material can be controlled by adjusting the mixing ratio of each of the raw materials.

As specific examples of the positive electrode active material, $aLi_2MnO_3$-$bLiNi_{1/2}Mn_{1/2}O_2$-$cLiNi_{1/3}Mn_{1/3}Co_{1/3}O_2$, $aLi_2MnO_3$-$bLiNi_{2/3}Mn_{1/3}O_2$-$cLiNi_{1/3}Mn_{1/3}Co_{1/3}O_2$, $aLi_2MnO_3$-$bLiNi_{1/2}Mn_{1/2}O_2$-$cLiNi_{1/3}Al_{1/3}Co_{1/3}O_2$, $aLi_2MnO_3$-$bLiNi_{1/2}Mn_{1/2}O_2$-$cLiCoO_2$, $aLi_2MnO_3$-$bLiNi_{2/3}Mn_{1/3}O_2$-$cLiCoO_2$, $aLi_2MnO_3$-$bLiNiO_2$-$cLiCoO_2$, $aLi_2MnO_3$-$bLiNiO_2$-$cLiNi_{1/3}Mn_{1/3}Co_{1/3}O_2$ or the like as mentioned above can be given. The positive electrode active material is not limited thereto.

In the invention, the surface of the positive electrode active material may be modified with a lithium ion conductive oxide-based solid electrolyte. By modification, generation of interfacial resistance between the solid electrolyte and the positive electrode active material can be suppressed, whereby a high output can become possible.

As the ion conductive oxide-based solid electrolyte for modification, $Li_4Ti_5O_{12}$, LISICONs, crystals having a perovskite structure such as $La_{0.55}Li_{0.35}TiO_3$, $LiTi_2P_3O_{12}$ having a NASICON structure, and an electrolyte obtained by crystallization thereof or the like can be given. In addition, a $Li_4SiO_4$—$Li_2O$-based, a $Li_2O$—$B_2O_3$—$P_2O_5$-based, a $Li_2O$—$B_2O_3$—ZnO-based, a $Li_2O$—$Al_2O_3$—$SiO_2$—$P_2O_5$—$TiO_2$-based oxide-based amorphous solid electrolyte, or $LiNbO_3$, $LiTaO_3$ can be used. The positive electrode active material is modified by coating its surface with these materials.

The thickness of the ion conductive oxide-based solid electrolyte is preferably 0.1 nm or more and 50 nm or less, with 0.5 nm or more and 30 nm or less being further preferable.

It is preferred that the positive electrode active material be in the form of particles. The particle size is preferably 20 μm or less, more preferably 0.01 μm or more and 15 μm or less, further preferably 0.1 μm or more and 10 μm or less, with 0.5 μm or more and 8 μm or less being most preferable. Here, if the positive electrode active material is surface-modified, the particle size of the positive electrode active material means the particle size in the state of particles before surface modification.

The particle size means a median diameter ($D_{50}$) measured by means of a laser diffraction/scattering particle size distribution analyzer (product name: "MICROTRAC HRA", Model No. 9320-X100 (manufactured by Nikkiso Co., Ltd.).

The specific surface area (BET surface area) of the positive electrode active material is preferably 0.20 m²/g or more and 2.00 m²/g or less, and particularly preferably 0.35 m²/g or more and 1.50 m²/g or less.

The specific surface area (BET surface area) means a value measured by a nitrogen absorption BET method by means of a NOVA 2000 (manufactured by Quantum Chrome Co., Ltd.) after deaerating the solid-solution positive electrode active material to be measured at 200° C. for 20 minutes, for example.

The solid electrolyte comprising Li and S that is used in the first positive electrode mixture of the invention is glass or glass ceramics that satisfies the composition represented by the following formula.

wherein M is an element selected from B, Zn, Si, Cu, Ga, 0 and Ge.

a to d are independently a composition ratio of each element, and a:b:c:d satisfies 1 to 12:0 to 0.2:1:2 to 9. b is preferably 0, more preferably the ratio of a, c and d is a:c:d=1 to 9:1:3 to 7, further preferably a:c:d=1.5 to 4:1:3.25 to 4.5.

The composition ratio of each element can be controlled by adjusting the blending amount of the raw materials used at the time of producing an electrolyte.

A preferable electrolyte used in the electrolyte layer of the invention at least contains lithium (Li), phosphorus (P) and sulfur (S). The electrolyte may further be subjected to a flame retardant treatment.

The electrolyte may be a sulfide-based glass ceramics solid electrolyte having a crystallization degree of 50% or more. If the crystallization degree is less than 50%, effects that ion conductivity can be improved by crystallization may be small.

The electrolyte may be a mixture of a sulfide-based glass ceramics solid electrolyte and a sulfide-based glass solid electrolyte.

Here, as the crystal structure, for example, a $Li_7PS_6$ structural body, a $Li_4P_2S_6$ structural body, a $Li_3PS_4$ structural body, a $Li_4SiS_4$ structural body, a $Li_2SiS_3$ structural body disclosed in JP-A-2002-109955, and a $Li_7P_3S_{11}$ structural body disclosed in JP-A-2005-228570 or WO2007/066539 are preferable. A $Li_7P_3S_{11}$ structural body is most preferable.

The $Li_7P_3S_{11}$ structure has a diffraction peak at 2θ=17.8±0.3 deg, 18.2±0.3 deg, 19.8±0.3 deg, 21.8±0.3 deg, 23.8±0.3 deg, 25.9±0.3 deg, 29.5±0.3 deg and 30.0±0.3 deg in an X-ray diffraction spectrometry (CuKα:λ=1.5418 Å).

With the above-mentioned crystal structure, the ion conductivity becomes higher than that of an amorphous body.

A crystallized part of the sulfide-based solid electrolyte used in the invention may be formed of one crystal structure or may have plural crystal structures.

The degree of crystallization can be measured by using a NMR spectroscopy apparatus. Specifically, a solid $^{31}$P-NMR spectrum of the solid electrolyte is measured. For the resulting spectrum, a resonance line observed at 70 to 120 ppm is separated into Gaussian curve by using the non-linear least squares method. Then, an area ratio of each curve is obtained.

The positive electrode active material used in the invention has a high capacity. The sulfide-based solid electrolyte can conduct charging and discharging by setting a charging potential to 4.5 V or more. If charging and discharging are conducted by a battery using a liquid electrolyte, the electrolyte is decomposed, leading to cycle deterioration to cause the battery performance to be lowered. The above-mentioned sulfide-based solid electrolyte has a wide potential window, and hence it is not decomposed even if a voltage of 4.5 V or more is applied. Therefore, by using such a solid electrolyte, a high-energy density type all-solid lithium-ion secondary battery having a high capacity and excellent cycle performance can be provided.

The sulfide-based solid electrolyte can be produced from a raw material such as lithium sulfide and phosphorus pentasulfide, or lithium sulfide, a single substance of phosphorus and a single substance of sulfur, or further lithium sulfide, phosphorus pentasulfide, a single substance of phosphorus and/or a single substance of sulfur.

No specific restrictions are imposed on lithium sulfide, and commercially available product can be used. However, one having a high purity is preferable.

It is preferred that the lithium sulfide have a total content of lithium salts in a sulfur oxide of 0.15 mass % or less, more preferably 0.1 mass % or less, and the total content of lithium N-methylaminobutyrate is 0.15 mass % or less, more preferably 0.1 mass % or less. If the total content of lithium salts of a sulfur oxide is 0.15 mass % or less, a solid electrolyte obtained by melt quenching or mechanical milling becomes a glassy electrolyte (complete amorphous). On the other hand, if the total content of lithium salts of a sulfur oxide exceeds 0.15 mass %, the resulting electrolyte may be crystalline from the beginning, and the ion conductivity of this crystalline product is low. Further, if this crystalline product is subjected to a heat treatment, no change is observed in the crystalline product, and a sulfide-based solid electrolyte having a high ion conductivity may not be obtained.

If the content of lithium N-methylaminobutyrate is 0.15 mass % or less, there is no possibility that a deteriorated product of lithium N-methylaminobutyrate lowers the cyclic performance of a lithium ion battery. If lithium sulfide having a reduced amount of impurities is used, a highly ion conductive electrolyte is obtained.

No specific restrictions are imposed on the method for producing lithium sulfide, as long as the amount of the above-mentioned impurities can be reduced. For example, highly pure lithium sulfide can be obtained by purifying lithium sulfide produced by the following methods a to c. Among the following production methods, the method a or the method b is particularly preferable.
a. Lithium hydroxide and hydrogen sulfide are reacted in an aprotic organic solvent at 0 to 150° C. to form lithium hydrosulfide. Then, this reaction liquid is dehydrosulfurized at 150 to 200° C. (see JP-A-H07-330312).
b. Lithium hydroxide and hydrogen sulfide are reacted in an aprotic organic solvent at 150 to 200° C. to directly form lithium sulfide (see JP-A-H07-330312).
c. Lithium hydroxide and a gas-like sulfur source are reacted at 130 to 445° C. (see JP-A-H09-283156).

No specific restrictions are imposed on the method for purifying lithium sulfide. A purification method described in WO2005/40039 can preferably be given.

For example, lithium sulfide obtained by the above-mentioned method is washed with an organic solvent at a temperature of 100° C. or higher.

The organic solvent used for washing is preferably an aprotic polar solvent. It is more preferred that an aprotic organic solvent used for production of lithium sulfide and an aprotic organic solvent used for washing be the same.

As the aprotic polar organic solvent preferably used for washing, an aprotic polar organic compound such as an amide compound, a lactam compound, a urea compound, an organic sulfur compound, a cyclic organic phosphorus compound or the like can be given, for example. They may be preferably used as a single solvent or a mixed solvent. In particular, N-methyl-2-pyrrolidone (NMP) is an excellent solvent.

The amount of an organic solvent used for washing is not particularly restricted, and the frequency of washing is not also particularly restricted. The frequency of washing is preferably twice or more. It is preferred that the washing be conducted in an inert gas atmosphere such as nitrogen and argon.

By drying the washed lithium sulfide at a temperature that is equal to or higher than the boiling point of an organic solvent used for washing in a stream of an inert gas such as nitrogen at normal pressure or reduced pressure for 5 minutes or longer, preferably for about 2 to 3 hours or longer, lithium sulfide used in the invention can be obtained.

No particular restrictions are imposed on phosphorus pentasulfide ($P_2S_5$) as long as it is produced and sold on the commercial basis. Instead of $P_2S_5$, a single substance of phosphorus (P) and a single substance of sulfur (S) can be used in a corresponding molar ratio. A single substance of phosphorous (P) and a single substance of sulfur (S) are not particularly restricted, and those produced and sold on the commercial basis can be used.

The mixing molar ratio of lithium sulfide, phosphorus pentasulfide or a single substance of phosphorus (P) and a single substance of sulfur (S) is normally 50:50 to 80:20, preferably 60:40 to 75:25.

The mixing molar ratio is particularly preferably $Li_2S$:$P_2S_5$=68:32 to 74:26 (molar ratio).

As the method for producing a sulfide-based glass solid electrolyte, the melt quenching method, the mechanical milling method (MM method) and the slurry method can be given.

In the case of the melt quenching method, a prescribed amount of $P_2S_5$ and $Li_2S$ are mixed in a mortar to allow them to be in the form of a pellet. The resulting pellet is put in a quarts tube coated with carbon and vacuum sealed. After allowing them to react at a prescribed reaction temperature, the reaction product is put in ice for quenching, whereby a sulfide-based glass solid electrolyte is obtained.

The reaction temperature at this time is preferably 400° C. to 1000° C., more preferably 800° C. to 900° C.

The reaction time is preferably 0.1 hour to 12 hours, more preferably 1 to 12 hours.

The quenching temperature of the above-mentioned reaction product is normally 10° C. or less, preferably 0° C. or less. The cooling rate is normally about 1 to 10000 K/sec, preferably 10 to 10000 K/sec.

In the case of the MM method, a prescribed amount of $P_2S_5$ and $Li_2S$ are mixed in a mortar, and the mixture is allowed to react for a prescribed period of time by using various ball mills, whereby a sulfide-based glass solid electrolyte is obtained.

In the MM method using the above-mentioned raw materials, a reaction can be conducted at room temperature. According to the MM method, there is an advantage that, since a glass solid electrolyte can be produced at room temperature, thermal decomposition of the raw materials does not occur, whereby a glass solid electrolyte having a composition same as that of charging can be obtained.

Further, in the MM method, there is also an advantage that, simultaneously with the production of a glass solid electrolyte, a glass solid electrolyte can be finely pulverized.

The MM method can be conducted by various mills such as a rotary ball mill, a tumbling ball mill, a vibration ball mill, a planetary ball mill or the like.

As for the conditions for the MM method, if a planetary ball mill is used, for example, the milling may be conducted for 0.5 hour to 100 hours with a rotation speed of several tens to several hundreds rotation per minute.

Hereinabove, specific examples of a sulfide-based glass solid electrolyte by the melt quenching method and the MM method are explained. The production conditions such as temperature conditions or treatment times can be appropriately adjusted according to the equipment used.

The slurry method is described in WO2004/093099 and WO2009/047977.

Specifically, by allowing a prescribed amount of raw materials (for example, $P_2S_5$ particles and $Li_2S$ particles) to react in an organic solvent for a predetermined period of time, a sulfide-based glass solid electrolyte can be obtained.

Here, as described in JP-A-2010-140893, in order to proceed the reaction, a reaction may be conducted while circulating a slurry containing raw materials between the beads mill and the reaction apparatus.

The reaction temperature is preferably 20° C. or more and 80° C. or less, more preferably 20° C. or more and 60° C. or less.

The reaction time is preferably 1 hour or longer and 16 hours or shorter, more preferably 2 hours or longer and 14 hours or shorter.

The raw materials (lithium sulfide and phosphorus pentasulfide, for example) is preferably used in an amount that they become in the form of a solution or a slurry by addition of an organic solvent. Normally, the amount (total amount) of the raw materials relative to 1 liter of the organic solvent is about 0.001 kg or more and 1 kg or less, preferably 0.005 kg or more and 0.5 kg or less, with 0.01 kg or more and 0.3 kg or less being particularly preferable.

No particular restrictions are imposed on the type of the organic solvent. An aprotic organic solvent is particularly preferable.

As for the aprotic organic solvent, an aprotic organic solvent (for example, a hydrocarbon-based organic solvent), an aprotic polar organic compound (for example, an amide compound, a lactam compound, a urea compound, an organic sulfur compound, a cyclic organic phosphorus compound or the like) may preferably be used as a single solvent or a mixed solvent.

As the hydrocarbon-based organic solvent, saturated hydrocarbon, unsaturated hydrocarbon or aromatic hydrocarbon can be used.

As the saturated hydrocarbon, hexane, pentane, 2-ethylhexane, heptane, decane, cyclohexane or the like can be given.

As the unsaturated hydrocarbon, hexene, heptene, cyclohexene or the like can be given.

As the aromatic hydrocarbon, toluene, xylene, decalin, 1,2,3,4-tetrahydronaphthalene or the like can be given.

Among them, toluene and xylene are particularly preferable.

It is preferred that the hydrocarbon-based solvent be dehydrated in advance. Specifically, the water content is preferably 100 wt ppm or less, with 30 wt ppm or less being particularly preferable.

According to need, other solvents may be added to the hydrocarbon-based solvent. Specific examples include ketones such as acetone and methyl ethyl ketone; ethers such as tetrahydrofuran; alcohols such as ethanol and butanol; esters such as ethyl acetate; and halogenated hydrocarbons such as dichloromethane and chlorobenzene.

Thereafter, the resulting sulfide-based glass solid electrolyte is subjected to a heat treatment at a prescribed temperature, whereby a sulfide-based crystallized glass (glass ceramics) solid electrolyte is generated.

The heat treatment temperature at which a sulfide-based crystallized glass solid electrolyte is preferably 180° C. to 330° C., more preferably 200° C. to 320° C., and particularly preferably 210° C. to 310° C. If the heat treatment temperature is lower than 180° C., crystallized glass having a high crystallization degree may not be obtained easily. If the heat treatment temperature is higher than 330° C., crystallized glass having a low crystallization degree may be generated.

When the heat treatment temperature is 180° C. or higher and 210° C. or lower, the heat treatment time is preferable 3 to 240 hours, with 4 to 230 hours being particularly preferable. Further, when the heat treatment temperature is higher than 210° C. and 330° C. or less, the heat treatment time is preferably 0.1 to 240 hours, particularly preferably 0.2 to 235 hours, and further preferably 0.3 to 230 hours.

If the heat treatment time is shorter than 0.1 hour, crystallized glass having a high crystallization degree may not be obtained easily. If the heat treatment time is longer than 240 hours, crystallized glass having a low crystallization degree may be generated.

It is preferred that the sulfide-based crystallized glass solid electrolyte have diffraction peaks at $2\theta=17.8\pm0.3$ deg, $18.2\pm0.3$ deg, $19.8\pm0.3$ deg, $21.8\pm0.3$ deg, $23.8\pm0.3$ deg, $25.9\pm0.3$ deg, $29.5\pm0.3$ deg, and $30.0\pm0.3$ deg in an X-ray diffraction spectrometry (CuK$\alpha$:$\lambda$=1.5418 Å).

The solid electrolyte having such a crystal structure has a significantly high lithium ion conductivity.

It is preferred that the electrolyte be a particle having a particle size of 0.01 μm or more and 100 μm or less.

The particle size can be measured by the laser diffraction particle size distribution measurement. By this method, measurement can be conducted without drying the sample. A group of particles is irradiated with laser light and the scattered light is analyzed to measure the particle size distribution.

The shape of the electrolyte is not particularly restricted, and the electrolyte may be in the form of particles or a plate. It may be fused with the positive electrode active material.

The first positive electrode mixture of the invention can be produced by mixing the positive electrode active material represented by the formula (1) and the solid electrolyte containing Li and S, mentioned above. The mixing ratio of the positive electrode active material and the solid electrolyte is preferably active material:electrolyte=20 to 99:80 to 1 in terms of weight ratio. More preferably, the mixing ratio is active material:electrolyte=25 to 99:75 to 1 in terms of weight ratio.

The positive electrode mixture of the invention may contain a conductive aid in addition to the positive electrode active material and the solid electrolyte mentioned above. It suffices that the conductive aid have conductivity. The conductivity of the conductive aid is preferably $1\times10^3$ S/cm or more, more preferably $1\times10^5$ S/cm or more. The conductivity is measured by the AC impedance method.

As the conductive aid, a material selected from a carbon material, metal powder and a metal compound, and a mixture thereof can be given.

As specific examples of the conductive aid, a material that contains at least one element selected from the group consisting of carbon, nickel, copper, aluminum, indium, silver, cobalt, magnesium, lithium, chromium, gold, ruthenium, platinum, beryllium, iridium, molybdenum, niobium, osmium, rhodium, tungsten, and zinc. The conductive aid is more preferably a single substance of carbon having a high conductivity, a single substance, a mixture or a compound of a metal including carbon, nickel, copper, silver, cobalt, magnesium, lithium, ruthenium, gold, platinum, niobium, osmium or rhodium.

Specific examples of the carbon material include carbon black such as Ketjen black, acetylene black, denka black, thermal black and channel black, graphite, carbon fibers, activated carbon or the like.

Among these, acetylene black, denka black and Ketjen black having a high electron conductivity are preferable.

A conductive aid may be used singly or in combination of two or more. The amount of a conductive aid in the positive electrode mixture is preferably 0.01 wt % to 30 wt % relative to the total of the active material represented by the formula (1) and the solid electrolyte.

The positive electrode mixture may contain a binder.

As the binder, a fluorine-containing resin such as polytetrafluoroethylene (PTFE), polyvinylidene fluoride (PVDF) and fluorine rubber, or a thermoplastic resin such as polypropylene and polyethylene, an ethylene-propylene-dien rubber (EPDM), sulfonated EPDM, natural butyl rubber (NBR) or the like may be used singly or in combination of two or more. Further, a water dispersion such as cellulose-based rubber or styrene butadiene rubber (SBR) as a water-based binder can also be used.

The amount of the binder in the positive electrode mixture is preferably 0.01 wt % to 20 wt % relative to the total of the active material represented by the formula (1) and the solid electrolyte.

B. Second Positive Electrode Mixture

The second positive electrode mixture comprises a positive electrode mixture containing the positive electrode active material represented by the following formula (3) and a solid electrolyte that comprises Li and S, and has a particle diameter of 15 μm or less.

$$x\text{Li}_{2-p}[\text{Li}_p\text{Mn}]\text{O}_3\text{-}y\text{LiRO}_2\text{-}z\text{LiR'O}_2\text{-}w\text{LiMn}_\alpha\text{Ni}_\beta\text{Co}_\gamma\text{O}_\omega \quad (3)$$

wherein x+y+z+w=1, 0<x<1, 0≤y<1, 0≤z<1 and 0≤w<1, provided that at least one of y, z and w is larger than 0.

R and R' are any of Ni, Mn, Ni$_{0.5}$Mn$_{0.5}$, Co, Cr, Ni$_{1/3}$Co$_{1/3}$Mn$_{1/3}$, Mn$_{0.31}$Ni$_{0.44}$Co$_{0.25}$, Ti, Fe and V.

p is 0 or more and 1.6 or less.

α is 0 or more and 0.7 or less, β is 0 or more and 0.7 or less, γ is 0 or more and 0.7 or less, ω is 0 or more and 0.9 or less. At least one of α, β, γ and ω is not 0.

If the ratio of x is away from 1, the electron conductivity is increased, whereby the mixture becomes electrochemically active and has an increased capacity. Further, since the mixture becomes stabilized, it is useful as a material for a battery (i.e. cyclic properties are improved). On the other hand, if the ratio of x is away from 0, the theoretical capacity is increased. When an active material is produced with the above-mentioned solid solution ratio, it becomes possible to form an active material that is stable at a high potential and has a high capacity.

R and R' may be the same as or different from each other, and any of Ni, Mn, Ni$_{0.5}$Mn$_{0.5}$, Co, Cr, Ni$_{1/3}$Co$_{1/3}$Mn$_{1/3}$, Mn$_{0.31}$Ni$_{0.44}$Co$_{0.25}$, Ti, Fe and V. It is preferred that R and R' be any of Ni, Mn, Ni$_{0.5}$Mn$_{0.5}$, Co, Cr, Ni$_{1/3}$Co$_{1/3}$Mn$_{1/3}$, Mn$_{0.31}$Ni$_{0.44}$Co$_{0.25}$, Ti and Fe. More preferably, R and R' are any of Ni, Mn, Ni$_{0.5}$Mn$_{0.5}$, Co, Cr, Ni$_{1/3}$Co$_{1/3}$Mn$_{1/3}$, Mn$_{0.31}$Ni$_{0.44}$Co$_{0.25}$, and Fe.

The formula (3) is preferably the following formula (3-1), (3-2) or (3-3).

$$x\text{Li}_{2-p}[\text{Li}_p\text{Mn}]\text{O}_3\text{-}y\text{LiRO}_2\text{-}z\text{LiR'O}_2 \quad (3\text{-}1)$$

x, y and z in the formula (3) satisfy the following formulas (4) to (7).

$$x+y+z=1 \quad (4)$$

$$0<x<1 \quad (5)$$

$$0\leq y<1 \quad (6)$$

$$0\leq z<1 \quad (7)$$

However, at least one of y and z is larger than 0.

p is 0 or more and 1.6 or less. Preferably, p is 0 or more and 1.4 or less.

Preferably 0.1<x<0.98, and more preferably 0.2<x<0.96.
Preferably 0.1<y<0.98, more preferably 0.2<y<0.96.
Preferably 0≤z<0.98, and more preferably 0≤z<0.96.

As the positive electrode active material represented by the formula (3-1), compounds represented by the following formula (3-1-1), (3-1-2) or (3-1-3) can be exemplified.

$$a\text{Li}_2\text{MnO}_3\text{-}b\text{LiCoO}_2\text{-}c\text{LiMn}_{0.5}\text{Ni}_{0.5}\text{O}_2 \quad (3\text{-}1\text{-}1)$$

In the formula (3-1-1), a+b+c=1, 0<a≤0.7 (preferably 0.1≤a≤0.5), 0<b≤0.7 (preferably 0.03≤b≤0.5), and 0<c≤0.9 (preferably 0.03≤c≤0.8).

$$d\text{Li}_2\text{MnO}_3\text{-}e\text{LiNiO}_2 \quad (3\text{-}1\text{-}2)$$

In the formula (3-1-2), d+e=1, 0<d≤0.5 (preferably 0.05≤d≤0.5), and 0.5≤e<1 (preferably 0.5≤e≤0.95).

$$g\text{Li}_{3/2}[\text{Li}_{1/2}\text{Mn}]\text{O}_3\text{-}h\text{LiCoO}_2\text{-}i\text{Li}[\text{Mn}_{1/2}\text{Ni}_{1/2}]\text{O}_2 \quad (3\text{-}1\text{-}3)$$

In the formula (3-1-3), g+h+i=1, 0<g≤1 (preferably 0<g≤0.8), 0<h≤1 (preferably, 0<h≤0.7), and 0<i≤1 (preferably 0<i≤0.7).

$$x\text{Li}_{2-p}[\text{Li}_p\text{Mn}]\text{O}_3\text{-}w\text{LiMn}_\alpha\text{Ni}_\beta\text{Co}_\gamma\text{O}_\omega \quad (3\text{-}2)$$

In the formula (3-2), w+x=1, 0<x<1 and 0<w<1.

α is 0 or more and 0.7 or less, β is 0 or more and 0.7 or less, γ is 0 or more and 0.7 or less, ω is 0 or more and 0.9 or less, and at least one of α, β, γ and ω is not 0.

p is 0 or more and 1.6 or less.

Preferably, 0.1<x<1 and 0.1<w<1. α is 0 or more and 0.8 or less, β is 0 or more and 0.8 or less, γ is 0 or more and 0.8 or less, ω is 0 or more and 4 or less and p is 0 or more and 1.6 or less.

$$x\text{Li}_2\text{MnO}_3\text{-}y\text{LiMn}_{0.31}\text{Ni}_{0.44}\text{Co}_{0.25}\text{O}_2 \quad (3\text{-}3)$$

In the formula (3-3), x+y=1, 0<x<1 and 0<y<1, preferably 0.01<x<0.8 and 0.01<y<0.8.

As the positive electrode active material in the formula (3), the following specific compounds can be exemplified.

$$\text{Li}[\text{Ni}_{0.17}\text{Li}_{0.2}\text{Co}_{0.07}\text{Mn}_{0.56}]\text{O}_2$$

$$0.5\text{Li}_2\text{MnO}_3\cdot 0.5\text{LiMn}_{0.31}\text{Ni}_{0.44}\text{Co}_{0.25}\text{O}_2$$

$$\text{Li}_{1.048}(\text{Mn}_{0.333}\text{Ni}_{0.333}\text{Co}_{0.333})_{0.95202}\text{O}_2$$

The particle size of the positive electrode active material is preferably 0.01 μm or more and 15 μm or less, more preferably 0.1 μm or more and 10 μm or less, and further preferably 0.5 μm or more and 8 μm or less.

As is the case in the above-mentioned first positive electrode mixture, the surface of the positive electrode active material can be modified with a lithium ion conductive oxide-based solid electrolyte.

Other materials than the positive electrode active material, such as a solid electrolyte that comprises Li and S, are the same as those for the above-mentioned first positive electrode mixture, and hence an explanation is omitted.

The positive electrode mixture of the invention is preferable as the raw material or the constituting element of the positive electrode of a lithium ion battery.

C. First All-Solid Lithium Ion Battery of the Invention

The all-solid lithium ion battery of this embodiment comprises a positive electrode layer comprising the positive electrode active material represented by the above-mentioned formula (1) and a solid electrolyte comprising Li and S, and an electrolyte layer comprising a solid electrolyte that contains Li and S. As for the other configurations, such as a negative electrode layer or a current collector, a known element can be used.

The positive electrode layer of the all-solid lithium ion battery of this embodiment comprises the first positive electrode mixture mentioned above.

The thickness of the positive electrode layer is preferably 1 µm or more and 100 µm or less, more preferably 1 µm or more and 80 µm or less, and further preferably 1 µm or more and 70 µm or less.

The shape of the solid electrolyte in the positive electrode layer is not particularly restricted, and it may be in the shape of a particle or a plate. It may be fused to the positive electrode active material or the electrolyte may be fused to other electrolytes.

The shape of the positive electrode active material in the positive electrode layer is not particularly restricted. It may be in the form of a particle, for example.

The positive electrode can be produced by a known method. For example, it can be produced by a coating method, or an electrostatic method (an electrospray method, an electrostatic screen method or the like).

The electrolyte layer comprises a solid electrolyte that contains Li and S.

As for the solid electrolyte that comprises Li and S, the same solid electrolyte as the positive electrode mixture mentioned above can be used. The solid electrolyte of the electrolyte layer, the solid electrolyte of the positive electrode layer and the solid electrolyte of the negative electrode layer may be the same or different.

The shape of the solid electrode that comprises Li and S in the solid electrolyte layer is not particularly restricted, and it may be in the shape of a particle or a plate. It may be fused to the positive electrode active material or the electrolyte may be fused to other electrolytes.

Here, the fusion means that part of the solid electrolyte particles is dissolved and the dissolved part is integrated with other solid electrolyte particles. Further, the electrolyte layer may be a plate-like body of the solid electrolyte. The plate-like body includes a case where part or all of the solid electrolyte particles are dissolved to form a plate-like body.

It is preferred that the thickness of the electrolyte layer be 0.001 mm or more and 1 mm or less.

The electrolyte layer can be produced by a known method. For example, it can be produced by a coating method, an electrostatic method (an electrospray method, an electrostatic screen method or the like).

The negative electrode layer of the battery of the invention is not limited, and a known negative electrode layer can be used.

As in the case of the positive electrode layer, it may contain a conductive aid or a binder. Further, the type of the conductive aid or the binder is the same as that mentioned above, and an explanation is omitted.

As the negative electrode active material, a material to which a lithium ion can be inserted and from which a lithium ion can be removed, that is known in the field of batteries as a negative electrode material, can be used.

For example, carbon materials, specifically, artificial graphite, graphite carbon fiber, resin baked carbon, pyrolytic vapor grown carbon, coke, mesocarbon microbeads (MCMB), furfuryl alcohol resin baked carbon, polyacene, pitch-based carbon fibers, vapor grown carbon fibers, natural graphite and hardly graphitizable carbon or the like can be given. A mixture thereof may also be used. Artificial graphite is preferable.

Further, a metal itself such as metal lithium, metal indium, metal aluminum, metal silicon or the like or an alloy thereof obtained by combination with other elements or compounds may be used as a negative electrode material.

The thickness of the negative electrode is normally 0.01 mm or more and 10 mm or less, and the negative electrode can be produced in the same manner as that of the positive electrode.

A known current collector can be used. For example, a layer obtained by coating one that is reacted with a sulfide-based solid electrolyte (e.g. Au, Pt, Al, Ti or Cu) with Au or the like can be used.

D. Second All-Solid Lithium Ion Battery of the Invention

The all-solid lithium ion battery of this embodiment comprises a positive electrode produced by the above-mentioned positive electrode mixture of the invention and an electrolyte layer that comprises a solid electrolyte that contains Li and S.

As for the all-solid lithium ion battery of this embodiment, except that the positive electrode is produced from the positive electrode mixture of the invention as mentioned above, the electrolyte layer, the negative electrode layer, the current collector or the like are the same as those in the first all-solid lithium ion battery of the invention.

E. Third all-Solid Lithium Ion Battery of the Invention

The all-solid lithium ion battery of this embodiment comprises a positive electrode that comprises the above-mentioned second positive electrode mixture and an electrolyte layer that comprises a solid electrolyte that contains Li and S.

As for the all-solid lithium ion battery of this embodiment, except for that the positive electrode is produced from the second positive electrode mixture of the invention as mentioned above, the electrolyte layer, the negative electrode layer, the current collector or the like are the same as those in the first all-solid lithium ion battery of the invention.

The all-solid lithium ion battery of the invention can be produced by a known method. For example, it can be produced by laminating materials for a battery, followed by bonding. As the method for bonding, a method in which elements are stacked and the stacked body is pressurized and crimped, a method in which pressurization is conducted while passing through two rolls (roll to roll), or the like can be given.

EXAMPLES

Production of Solid Electrolyte

Production Example 1

(1) Production of Lithium Sulfide ($Li_2S$)

Lithium sulfide was produced in accordance with the method in the first aspect (two-step method) of JP-A-H07-330312. Specifically, in a 10 liter-autoclave provided with a stirring blade, 3326.4 g (33.6 mol) of N-methyl-2-pyrrolidone (NMP) and 287.4 g (12 mol) of lithium hydroxide were charged, stirred at a speed of 300 rpm and heated to 130° C. After the heating, hydrogen sulfide was blown to the liquid at a supply speed of 3 liter/min for 2 hours.

Subsequently, the reaction liquid was heated in a nitrogen stream (200 cc/min), and part of the reacted hydrogen sulfide was dehydrosulfurized. As the temperature was elevated, water produced as a by-product by the reaction of hydrogen sulfide and lithium hydroxide starts to evaporate. This water was condensed by means of a condenser and withdrawn outside the system. With distillation off of the water outside the system, the temperature of the reaction liquid was increased. When the temperature of the reaction liquid reached 180° C., the heating was stopped and the temperature was retained at a certain temperature. After completion of the dehydrosulfurization reaction (about 80 minutes), the reaction was completed, whereby lithium sulfide was obtained.

(2) Purification of Lithium Sulfide

NMP in 500 mL of the slurry reaction solution obtained in (1) above (NMP-lithium sulfide slurry) was subjected to decantation. 100 mL of dehydrated NMP was added, and stirred at 105° C. for about 1 hour. At that temperature, NMP was subjected to decantation. Further, 100 mL of NMP was added, and the mixture was stirred at 105° C. for about 1 hour. At that temperature, NMP was subjected to decantation. The similar operation was repeated 4 times in total. After completion of the decantation, lithium sulfide was dried for 3 hours at 230° C. (a temperature that is equal to or higher than the boiling temperature of NMP) under normal pressure and under nitrogen stream. The content of impurities in the resulting lithium sulfide was measured.

The content of each of the sulfur oxides of lithium sulfite ($Li_2SO_3$), lithium sulfate ($Li_2SO_4$) and lithium thiosulfate ($Li_2S_2O_3$) and the content of lithium N-methylaminobutyrate (LMAB) were quantified by ion chromatography. As a result, the content of sulfur oxides was found to be 0.13 mass % and the content of LMAB was found to be 0.07 mass %.

(3) Production of Solid Electrolyte

The lithium sulfide ($Li_2S$) produced in (2) above and the phosphorus pentasulfide ($P_2S_5$) (manufactured by Sigma-Aldrich Co.) were used as starting materials. About 1 g of a mixture obtained by mixing them at a molar ratio of 70:30 and 10 zirconia-made balls each having a diameter of 10 mm were put in a 45 mL-alumina made container. By means of a planetary ball mill (P-7, manufactured by Fritch Japan, Co., Ltd.), in nitrogen and at room temperature (25° C.), the materials were subjected to mechanical milling at a rotating speed of 370 rpm for 20 hours, whereby sulfide glass as white yellow powder was obtained. The glass transition temperature of this powder was measured by DSC (differential scanning calorimetry), and found to be 220° C.

By subjecting the sulfide glass to a heat treatment at 280° C. for 2 hours, sulfide glass ceramics was obtained.

For the resulting sulfide glass ceramics, an X-ray diffraction measurement was conducted. As a result, peaks were observed at 2θ=17.8, 18.2, 19.8, 21.8, 23.8, 25.9, 29.5 and 30.0 deg.

Further, the sulfide glass ceramics was dried, and the average particle size thereof was measured by a laser diffraction particle size distribution measurement apparatus (Mastersizer 2000 manufactured by Malvern Instruments Ltd.). The average particle size was about 5 μm.

Specifically, the measurement was conducted as follows.

First, 110 ml of dehydrated toluene (special grade (product name): manufactured by Wako Pure Chemical Industries, Ltd.) was put in a dispersion tank of an apparatus. Further, as a dispersant, 6% of tertiary butyl alcohol (special grade: manufactured by Wako Pure Chemical Industries, Ltd.) that has been dehydrated was added.

After fully mixing the above mixture, the "dry solid electrolyte particle" was added to measure the particle size. The amount of the "dry solid electrolyte particle" was added such that, in an operation screen stipulated by the Mastersizer 2000, the intensity of scattered laser light corresponding to the concentration of the particles fell within a specific range (10 to 20%). If the amount exceeds this range, multiple scattering occurs, and an accurate particle size distribution may not be obtained. Further, if the amount is smaller than this range, an SN ratio becomes poor, and an accurate measurement may not be conducted. In the Mastersizer 2000, since the intensity of scattered laser light is indicated based on the added amount of the "dry solid electrolyte particle", the added amount when the intensity of scattered laser light falls within the above-mentioned range can be found. As for the added amount of the "dry solid electrolyte or sulfide-based glass as a precursor thereof", although the optimum amount varies depending on the type or the like of the ionic conductive substance, the amount is about 0.01 g to 0.05 g.

Production of Positive Electrode Active Material
($0.5Li_2MnO_3$-$0.25Li[Ni_{1/2}Mn_{1/2}]O_2$-
$0.25Li[Ni_{1/3}Co_{1/3}Mn_{1/3}]O_2$=Li
)

Production Example 2

203.76 g of manganese sulfate pentahydrate, 66.98 g of nickel sulfate hexahydrate and 28.11 g of cobalt sulfate heptahydrate were weighed. They were dissolved in pure water, mixed and stirred to obtain 600 ml of a mixed aqueous solution of manganese, nickel and cobalt. To the pure water of which the temperature was kept at 60° C., the above-mentioned mixed aqueous solution and a sodium carbonate solution were mixed and stirred while keeping the pH in a range of 7.0 to 9.5, whereby an aqueous solution containing a manganese/nickel/cobalt carbonate was obtained. After washing this aqueous carbonate-containing solution with pure water and filtering, drying was conducted at 100° C. for 20 hours, whereby a manganese/nickel/cobalt carbonate was obtained.

The manganese/nickel/cobalt carbonate was classified by means of a sieve having an opening of 100 μm. Manganese-nickel-cobalt carbonate powder that had passed through the sieve was collected. The manganese/nickel/cobalt carbonate powder that had passed through the sieve was fired at 500° C. for 5 hours, whereby a manganese/nickel/cobalt oxide was obtained. This manganese/nickel/cobalt oxide was classified by means of a sieve having an opening of 100 μm, and manganese/nickel/cobalt oxide powder that had passed through the sieve was obtained.

The manganese/nickel/cobalt oxide powder that had passed through the sieve and lithium hydroxide monohydrate were mixed such that the ratio of Li/(Ni+Mn+Co) became 1.5. After firing at 1000° C. for 12 hours, the mixture was classified by means of a sieve having an opening of 32 μm. Powder that had passed through the sieve was further pulverized by means of a jet mill, whereby positive electrode active material powder having a $D_{50}$ of 3.5 μm and a BET of 1.2 m²/g was obtained.

Figure 3:
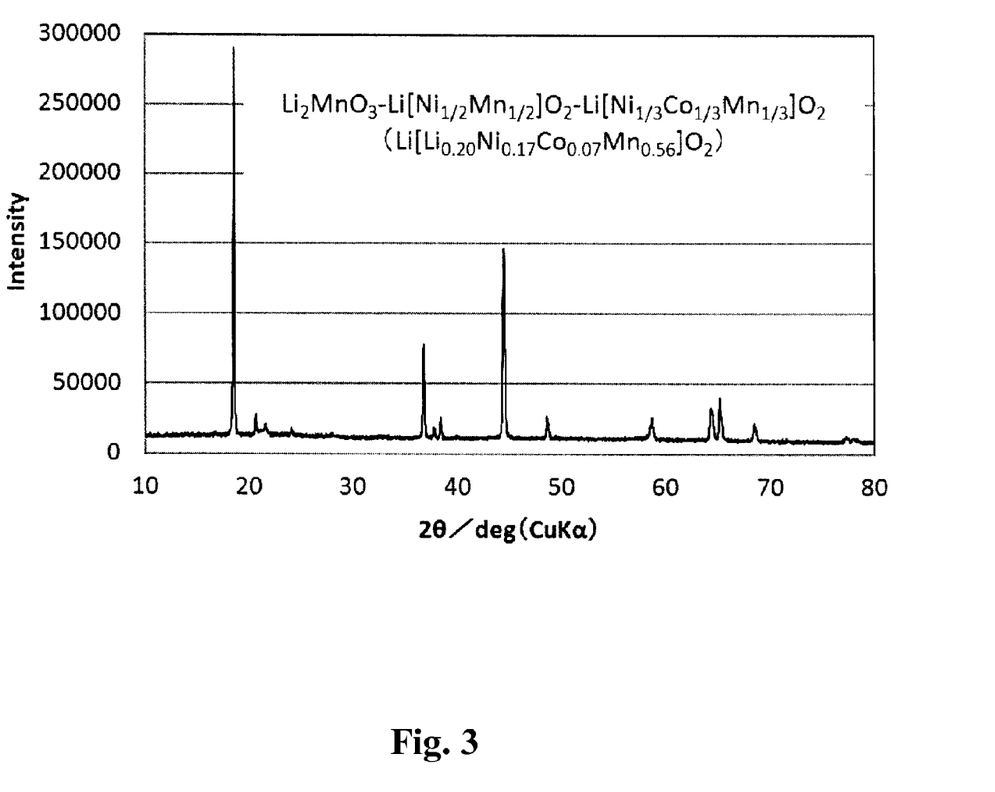
FIG. 3 is a result of powder X-ray diffraction (XRD) of the positive electrode active material prepared in Production Example 2 obtained by using CuKα rays.

The results of the X-ray diffraction (XRD) measurement of the resulting positive electrode active material powder by using CuKα rays are shown in FIG. 3. As a result, a diffraction peak observed in a $Li_2MnO_3$ ($Li[Li_{1/3}Mn_{2/3}]O_2$) type monoclinic crystal was confirmed at around $2\theta=20$ to $25°$. From this, it can be confirmed that the positive electrode active material finally obtained was a solid-solution positive electrode active material.

Modification of Positive Electrode Active Material

Production Example 3

By the method described in N. Ohta, K. Takada, L. Zhang, R. Ma, M. Osada, T. Sasaki, Adv. Mater. 18, 2226 (2006), N. Ohta, K. Takada, I. Sakaguchi, L. Zhang, R. Ma, K. Fukuda, M. Osada, T. Sasaki, Electrochemistry Communications 9,7, 1486 (2007), the positive electrode active material was coated.

As the solution for forming a coating layer, a mixed solution of 208.9 g of a titanium isopropoxide ($TiOCHCH_2CH_3$) solution having a purity of 99% and 491.1 g of a lithium ethoxide ($LiOCH_2CH_3$) solution that had been adjusted by 4.1 g of metal Li and 487 g of ethanol was used.

This solution was applied to the active material particles in Production Example 2 by the spray method. The particles were dried to remove excessive solvent. By using a muffle furnace, the particles were fired at 400° C. for 0.5 hours, whereby active material particles in which an LTO ($Li_{4/3}Ti_{5/3}O_4$) layer was formed on the surface of the positive electrode active material was obtained. The thickness of the LTO layer was 10 nm.

Further, by the method described in the above-mentioned literature, i.e. "Advanced materials 2006, 18, 2226-2229", LTO was applied in a thickness of 5 nm, 7 nm, 15 nm and 20 nm.

The thickness of the LTO layer was calculated based on the amount of Ti obtained by the elementary analysis, and the specific gravity and the BET surface area of LTO.

Production Example 4

The surface of the positive electrode active material was modified by the same method as in Production Example 3, except that $LiCoO_2$ was used as the active material particles. The thickness of the LTO layer was 5 nm.

Figure 4:
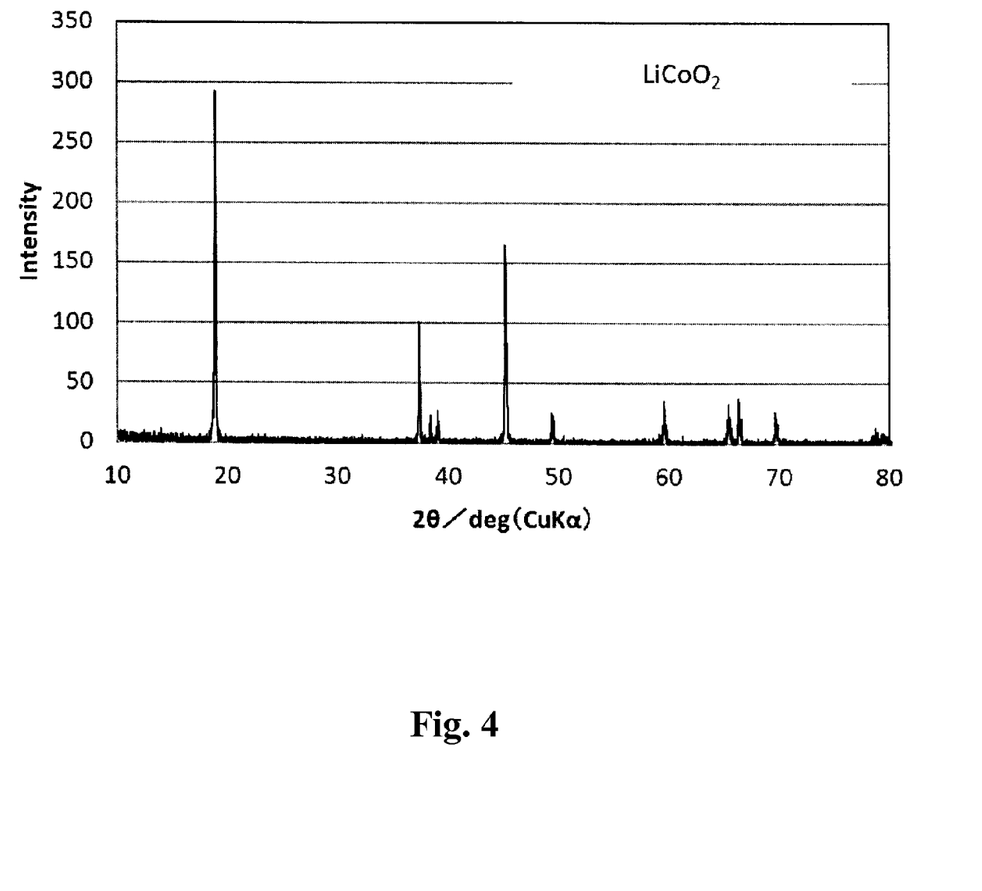
FIG. 4 is a result of powder X-ray diffraction (XRD) of LiCoO₂ in Production Example 4 obtained by using CuKα rays.

The results of the X-ray diffraction (XRD) measurement using CuKα rays of $LiCoO_2$ active material particles before the surface modification are shown in FIG. 4. As a result, a peak specific to a solid-solution positive electrode active material that was observed at around $2\theta=20$ to $25°$ was not confirmed.

Production Example 5

The surface of the positive electrode active material was modified by the same method as in Production Example 3, except that $LiNi_{0.8}Co_{0.15}Al_{0.05}O_2$ was used as the active material particles. The thickness of the LTO layer was 7 nm.

The X-ray diffraction (XRD) of $LiNi_{0.8}Co_{0.15}Al_{0.05}O_2$ active material particles before the surface modification was measured by using CuKα rays. As a result, a peak specific to a solid-solution positive electrode active material that was observed at around $2\theta=20$ to $25°$ was not confirmed.

Example 1

Production of Positive Electrode Mixture 1

29.2 mg of the sulfide glass ceramics produced in Production Example 1, 68.1 mg of the positive electrode active material (coating layer: 5 nm) produced in Production Example 3 and 3.2 mg of Ketjen black (EC600JD, manufactured by Lion Corporation) were mixed in a mortar, whereby a positive electrode mixture 1 was obtained.

Example 2

Production of Positive Electrode Mixture 2

A positive electrode mixture 2 was produced in the same manner as in Example 1, except that the positive electrode active material (coating layer: 7 nm) produced in Production Example 3 was used.

Example 3

Production of Positive Electrode Mixture 3

A positive electrode mixture 3 was produced in the same manner as in Example 1, except that the positive electrode active material (coating layer: 10 nm) produced in Production Example 3 was used.

Example 4

Production of Positive Electrode Mixture 4

A positive electrode mixture 4 was produced in the same manner as in Example 1, except that the positive electrode active material (coating layer: 15 nm) produced in Production Example 3 was used.

Example 5

Production of Positive Electrode Mixture 5

A positive electrode mixture 5 was produced in the same manner as in Example 1, except that the positive electrode active material (coating layer: 20 nm) produced in Production Example 3 was used.

Example 6

Production of Positive Electrode Mixture 6

A positive electrode mixture 6 was produced in the same manner as in Example 1, except that the positive electrode active material (no coating layer) produced in Production Example 2 was used.

Comparative Example 1

Production of Positive Electrode Mixture 7

A positive electrode mixture 7 was produced in the same manner as in Example 1, except that the positive electrode active material (coating layer: 5 nm) produced in Production Example 4 was used.

Comparative Example 2

Production of Positive Electrode Mixture 8

A positive electrode mixture 8 was produced in the same manner as in Example 1, except that the positive electrode active material (coating layer: 7 nm) produced in Production Example 5 was used.

Production of All-Solid Lithium Ion Battery

Example 7

50 mg of the electrolyte (sulfide glass ceramics) produced in Production Example 1 was put in a plastic-made cylinder having a diameter of 10 mm, followed by compression molding. Further, 14.7 mg of the positive electrode mixture 1 produced in Example 1 were put, and compression molding was conducted again. On the side opposite to the positive electrode mixture, in foil was put and bonded, whereby a battery having a three layer structure of a negative electrode, an electrolyte and a positive electrode was formed.

The resulting battery was subjected to a discharge test. The charging capacity was measured at conditions where a current density was 0.064 mA/cm$^2$ and a cut-off voltage was 4.8V. The discharging capacity was measured at a current density of 0.064 mA/cm$^2$ and a cut-off voltage of 2.0V. The battery evaluation was conducted at 100° C. The results are shown below.

Charging capacity: 220 mAh/g
Discharging capacity: 140 mAh/g

Example 8

An all-solid lithium ion battery was produced and evaluated in the same manner as in Example 7, except that the positive electrode mixture 2 was used. The results are shown below.

Charging capacity: 250 mAh/g
Discharging capacity: 170 mAh/g

Example 9

An all-solid lithium ion battery was produced and evaluated in the same manner as in Example 7, except that the positive electrode mixture 3 was used. The results are shown below.

Charging capacity: 260 mAh/g
Discharging capacity: 180 mAh/g

Example 10

An all-solid lithium ion battery was produced and evaluated in the same manner as in Example 7, except that the positive electrode mixture 4 was used. The results are shown below.

Charging capacity: 280 mAh/g
Discharging capacity: 220 mAh/g

Example 11

An all-solid lithium ion battery was produced and evaluated in the same manner as in Example 7, except that the positive electrode mixture 5 was used. The results are shown below.

Charging capacity: 300 mAh/g
Discharging capacity: 240 mAh/g

Example 12

An all-solid lithium ion battery was produced and evaluated in the same manner as in Example 7, except that the positive electrode mixture 6 was used. The results are shown below.

Charging capacity: 180 mAh/g
Discharging capacity: 120 mAh/g

Comparative Example 3

An all-solid lithium ion battery was produced and evaluated in the same manner as in Example 7, except that $LiCoO_2$ was used as the positive electrode active material. The results are shown below.

Charging capacity: 60 mAh/g
Discharging capacity: 40 mAh/g

Comparative Example 4

An all-solid lithium ion battery was produced and evaluated in the same manner as in Example 7, except that $LiNi_{0.8}Co_{0.15}Al_{0.05}O_2$ was used as the positive electrode active material. The results are shown below.

Charging capacity: 160 mAh/g
Discharging capacity: 100 mAh/g

Comparative Example 5

An all-solid lithium ion battery was produced and evaluated in the same manner as in Example 7, except that the positive electrode mixture 7 was used. The results are shown below.

Charging capacity: 145 mAh/g
Discharging capacity: 90 mAh/g

Comparative Example 6

An all-solid lithium battery was produced and evaluated in the same manner as in Example 7, except that the positive electrode mixture 8 was used. The results are shown below.

Charging capacity: 180 mAh/g
Discharging capacity: 110 mAh/g

The thickness of the coating layer of the positive electrode active material used in the Examples and the Comparative Examples, charging capacity and discharging capacity are shown in Table 1.

TABLE 1

|  | Thickness of coating layer (nm) | Charging capacity (mAh/g) | Discharging capacity (mAh/g) |
| --- | --- | --- | --- |
| Example 7 | 5 | 220 | 140 |
| Example 8 | 7 | 250 | 170 |
| Example 9 | 10 | 260 | 180 |
| Example 10 | 15 | 280 | 220 |
| Example 11 | 20 | 300 | 240 |
| Example 12 | 0 | 180 | 120 |
| Comp. Ex. 3 | 0 | 60 | 40 |
| Comp. Ex. 4 | 0 | 160 | 100 |
| Comp. Ex. 5 | 5 | 145 | 90 |
| Comp. Ex. 6 | 7 | 180 | 110 |

INDUSTRIAL APPLICABILITY

The all-solid lithium ion battery of the invention is used in PDA, a portable electronic device, a home-use compact power storage facility, an auto-bicycle powered by a motor, an electric vehicle, a hybrid electric vehicle or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in this specification and the Japanese application specification claiming priority under the Paris Convention are incorporated herein by reference in its entirety.

The invention claimed is:

1. A positive electrode mixture, comprising:
   a solid-solution positive electrode active material represented by the following formula (2); and
   a solid electrolyte that comprises Li and S:

$$a\text{Li}_2\text{MnO}_3\text{-}b\text{LiNi}_{1/2}\text{Mn}_{1/2}\text{O}_2\text{-}c\text{LiNi}_{1/3}\text{Mn}_{1/3}\text{Co}_{1/3}\text{O}_2 \quad (2),$$

wherein a, b and c satisfy a+b+c=1, 0<a<1, 0<b<1 and 0<c<1.

2. The positive electrode mixture according to claim 1, wherein the surface of the positive electrode active material is modified with an ionic conductive oxide-based solid electrolyte.

3. The positive electrode mixture according to claim 1, wherein the particle size of the positive electrode active material is 20 μm or less.

4. An all-solid lithium ion battery comprising:
   a positive electrode that is produced by using the positive electrode mixture according to claim 1; and
   an electrolyte layer comprising a solid electrolyte that comprises Li and S.

5. An all-solid lithium ion battery comprising:
   a positive electrode layer comprising a solid-solution positive electrode active material represented by the following formula (2) and a solid electrolyte that comprises Li and S; and
   an electrolyte layer comprising a solid electrolyte that comprises Li and S:

$$a\text{Li}_2\text{MnO}_3\text{-}b\text{LiNi}_{1/2}\text{Mn}_{1/2}\text{O}_2\text{-}c\text{LiNi}_{1/3}\text{Mn}_{1/3}\text{Co}_{1/3}\text{O}_2 \quad (2),$$

wherein a, b and c satisfy a+b+c=1, 0<a<1, 0<b<1 and 0<c<1.

* * * * *